United States Patent
Mccullough et al.

(10) Patent No.: US 6,895,041 B1
(45) Date of Patent: May 17, 2005

(54) DIGITAL SUBSCRIBER LINE POWER REDUCTION

(75) Inventors: Jason F. Mccullough, Austin, TX (US); Robert H. Locklear, Jr., Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 774 days.

(21) Appl. No.: 09/603,393

(22) Filed: Jun. 23, 2000

(51) Int. Cl.[7] .................................................. H04L 5/16
(52) U.S. Cl. ........................................ 375/222; 375/219
(58) Field of Search ................................. 375/222, 219, 375/229, 260, 240, 240.01, 240.29, 220, 221, 223; 709/200; 710/1; 379/90.01

(56) References Cited

U.S. PATENT DOCUMENTS

| | | | | |
|---|---|---|---|---|
| 6,005,893 A | * | 12/1999 | Hyll | 375/260 |
| 6,226,322 B1 | * | 5/2001 | Mukherjee | 375/229 |
| 6,292,515 B1 | * | 9/2001 | Kao et al. | 375/260 |
| 6,370,187 B1 | * | 4/2002 | Agah | 375/219 |
| 6,546,090 B1 | * | 4/2003 | Bremer et al. | 379/93.08 |
| 6,580,761 B2 | * | 6/2003 | Laroia et al. | 375/260 |
| 6,583,662 B1 | * | 6/2003 | Lim | 327/553 |
| 6,704,351 B1 | * | 3/2004 | Ott et al. | 375/222 |
| 6,772,437 B1 | * | 8/2004 | Cooper et al. | 725/111 |

\* cited by examiner

*Primary Examiner*—Young T. Tse
*Assistant Examiner*—Sam K. Ahn
(74) *Attorney, Agent, or Firm*—Baker Botts L.L.P.

(57) ABSTRACT

A communications system includes an xDSL communications device coupled to customer premises equipment via an xDSL link. The communications device trains the link, determines an available bandwidth for downstream communications, allocates a portion of the available bandwidth based on provisioned parameters of the link, and adjusts operational characteristics of a line driver to reduce the power consumption of the communications device.

33 Claims, 3 Drawing Sheets

DIGITAL SUBSCRIBER LINE POWER REDUCTION

TECHNICAL FIELD OF THE INVENTION

The present invention relates generally to digital subscriber line systems and more particularly to power reduction in digital subscriber line systems.

BACKGROUND OF THE INVENTION

Digital subscriber line (xDSL) equipment operated by service providers typically provides communication services for many customers. To provide simultaneous service to these customers, this equipment often has racks containing multiple xDSL communications cards. Physical requirements of the cards and industry standards can limit the number of devices that may be packed into an equipment rack. The power consumption of xDSL communications cards represents one of the primary limitations on the number of devices that may be located in a given area. Reduced power consumption reduces interference among closely spaced cards, reduces cooling requirements, and thus allows for increased density of devices in an equipment rack.

Moreover, the network equipment building standard (NEBS) specification developed by Bell Communications Research (BELLCORE) provides minimum industry standards for different telephony components, including xDSL communications equipment. These standards detail specific requirements for a NEBS compliant rack, such as the amount of power that it may consume and specific cooling requirements. Therefore, the power consumption of xDSL communications cards directly affects the number of these devices that may be contained in a NEBS compliant system.

SUMMARY OF THE INVENTION

In accordance with the present invention, a system and method for power reduction in digital subscriber line systems is provided which substantially eliminates or reduces disadvantages and problems associated with previous systems and methods. In a particular embodiment, the present invention satisfies a need for a communications device that reduces the power requirement for a digital subscriber line.

According to one embodiment of the present invention, a digital subscriber line (xDSL) communications server includes a digital engine operable to assign bits of data for transmission in an allocated bandwidth, a line driver operable to provide power across an effective power spectrum for transmitting the data, a memory storing provisioned parameters for an xDSL link, and a controller. The controller determines trained parameters of the xDSL link, wherein the trained parameters include an available bandwidth. The controller also allocates a portion of the available bandwidth as the allocated bandwidth based on the provisioned parameters and adjusts the effective power spectrum to correspond with the allocated bandwidth.

In accordance with another embodiment of the present invention, to reduce power consumption on an xDSL link, a method trains the xDSL link and determines trained parameters of the link, wherein the trained parameters comprise an available bandwidth. The method also determines provisioned parameters of the xDSL link, allocates a portion of the available bandwidth for xDSL communications based on the provisioned parameters, and adjusts analog characteristics of a line driver to correspond with the allocated portion of the available bandwidth.

The invention provides a number of technical advantages. The system provides a method for reducing the power requirements for xDSL communications equipment. By reducing the power used, less heat is generated, and cooling the equipment becomes more efficient and less costly. With reduced power consumption and cooling requirements, a system may increase the number and density of communications cards in an equipment installation. In a particular embodiment, this increased the available density of communications cards in a NEBS compliant equipment rack. Moreover, lowering power levels reduces the effects near end crosstalk (NEXT), potentially is increasing transmission quality.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
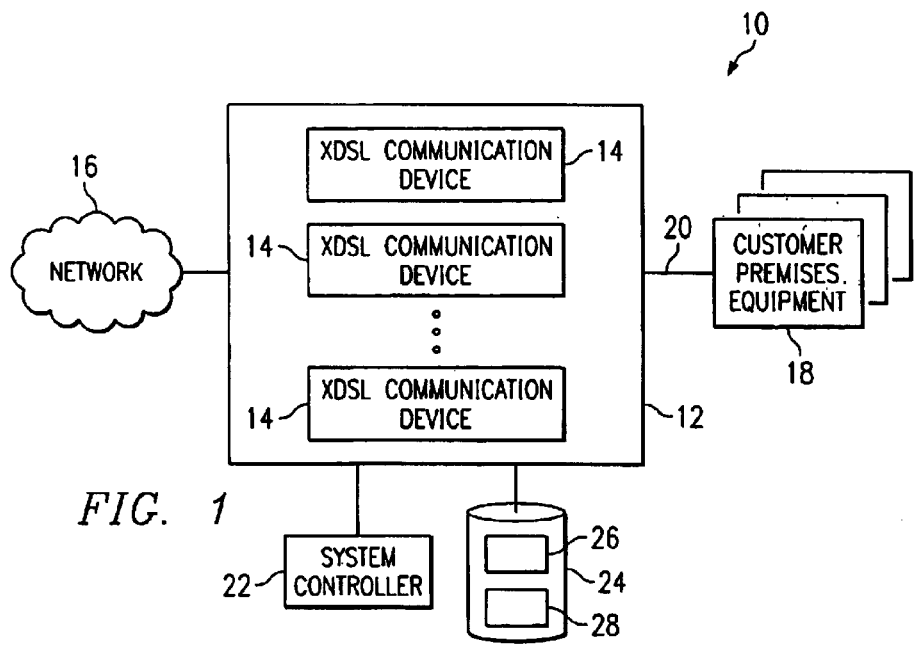
FIG. 1 illustrates a communications system including digital subscriber line (xDSL) communications devices in accordance with the teachings of the present invention.

FIG. 1 illustrates a communications system, indicated generally at 10, that includes a network equipment rack 12 having digital subscriber line (xDSL) communications devices 14 coupled to a network 16 and to customer premises equipment (CPE) 18. In general, communications devices 14 provide connectivity between customer premises equipment 18 and network 16. Moreover, devices 14 adjust operating characteristics to reduce power consumption and allow greater density of devices 14 in rack 12.

Network 16 provides communications between network equipment rack 12 and other network devices, such as other network equipment racks 12. For example, network 16 may be one or a collection of components associated with the public switched telephone network (PSTN), local area networks (LANs), wide area networks (WANs), a global computer network such as the Internet, or other suitable wireline or wireless communications technology supporting communications between multiple devices. CPE 18 represents communications and/or processing equipment maintained by subscribers of system 10. Each CPE 18 may be located at one or more physical locations, such as businesses, homes, storage facilities, buildings, or other locations. CPE 18 couples to a selected xDSL communications device 14 in rack 12 via a wireless or wireline link 20. In a particular embodiment, link 20 is a twisted pair, local loop telephone line.

Network equipment rack 12 represents any structure designed to house electronic equipment. For example, network equipment rack 12 may be an equipment rack having slots designed to accommodate devices 14. Network equipment rack 12 may provide power, cooling and other physical requirements for communications devices 14. In a particular embodiment, network equipment rack 12, taking into account all contained communications devices 14, meets or exceeds the requirements of the NEBS specification.

System 10 also includes a system controller 22 and a system memory 24. System memory 24 represents any one or combination of volatile or non-volatile, local or remote devices suitable for storing data, for example, random access memory (RAM) devices, read-only memory (ROM) devices, magnetic storage devices, optical storage devices, or any other suitable data storage devices. System memory 24 may store any suitable information, such as provisioned parameters 26 and trained parameters 28. Provisioned parameters 26 may include information describing links 20 to each CPE 18. Trained parameters 28 may include information describing operational characteristics for devices 14. System controller 22 provides operational, administrative, and management functions for equipment in system 10. Specifically, system controller 22 may configure devices 14 and determine and maintain information stored in memory 24, such as provisioned parameters 26 and trained parameters 28.

Communications device 14 represents hardware and/or software providing xDSL communications for CPE 18 using link 20. Device 14 communicates with CPE 18 via link 20 using an xDSL communications protocol. This xDSL communications protocol may be any appropriate digital subscriber line communications protocol, such as asymmetric DSL (ADSL), symmetric DSL (SDSL), or high rate DSL (HDSL). Thus the term xDSL refers to any appropriate digital subscriber line protocol. To establish an xDSL link, device 14 trains the link with CPE 18 on link 20. This trained link has available bandwidth for upstream (CPE 18 to rack 12) and downstream (rack 12 to CPE 18) communications.

A number of factors may impact the available bandwidth. For example, physical characteristics of link 20 such as the length of link 20, splices in link 20, interference from other links or equipment, loading on link 20, and other physical characteristics that affect the integrity of link 20 for xDSL communications may impact the available bandwidth. Moreover, the operation of multiple devices 14 within rack 12 may affect the available bandwidth for each individual communications device 14. In addition to the available bandwidth, the trained xDSL link may be characterized by any number of parameters, such as an available noise margin. The noise margin refers to excess power on link 20 to ensures that fluctuations in disturbances do not degrade xDSL transmissions.

In addition to the actual parameters of the xDSL link, each CPE 18 typically has provisioned parameters 26 describing the xDSL link "promised" to the subscriber. Administrators, system controller 22, or other components in system 10 may determine provisioned parameters 26 for subscribers based on any suitable criteria, such as the number of subscribers, the amount paid for the xDSL link, or other appropriate considerations. Provisioned parameters 26 include any suitable characteristics for an xDSL link, for example, minimum and maximum bandwidths for upstream and downstream data, a minimum or maximum acceptable noise margin, or other appropriate operating characteristics. These provisioned parameters 26 define a level of service assigned to CPE 18.

In operation, communications device 14 determines both actual trained parameters 28 and provisioned parameters 26 for an xDSL link. If trained parameters 28 exceed provisioned parameters 26, device 14 may adjust its operating characteristics without negatively impacting the level of service on the xDSL link. For example, if a subscriber at CPE 18 has purchased downstream bandwidth availability of 128 kbps, and the xDSL link trains to an available downstream bandwidth of 256 kbps, device 14 may modify its operating characteristics to provide only the provisioned 128 kbps bandwidth. By reducing the downstream bandwidth, device 14 reduces the frequency spectrum required, since device 14 needs less spectrum to transmit the reduced throughput. This decreased frequency spectrum corresponds to a reduction in the power required to modulate an xDSL signal on link 20. Thus, trained parameters 28 include a larger available frequency spectrum than device 14 needs to provide provisioned parameters 26. Device 14 capitalizes on this fact by using only a portion of the available spectrum sufficient to provide provisioned parameters 26. In a particular embodiment, device 14 provides the provisioned bandwidth using the lowest available frequencies from the available spectrum and reduces or eliminates the power provided for the upper frequencies. This results in a reduction in the power consumption of device 14.

Figure 2:
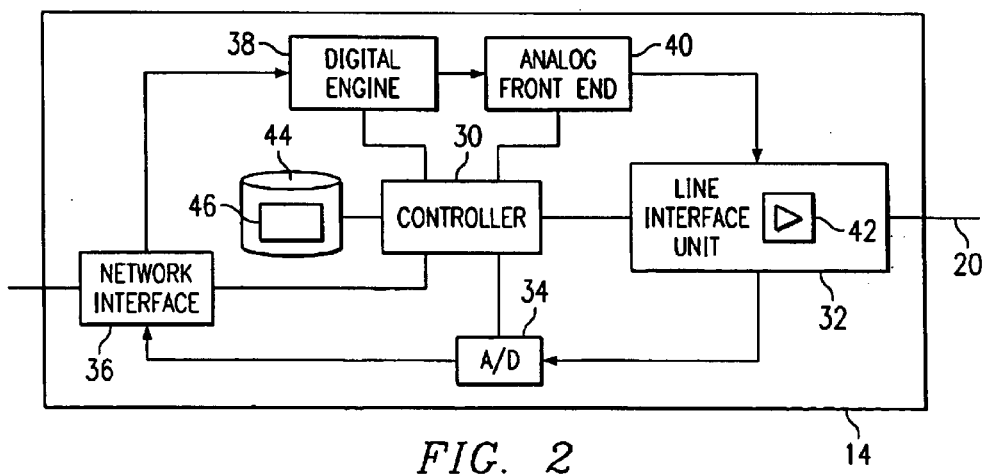
FIG. 2 is a block diagram illustrating in more detail an xDSL communications device from the communications system.

FIG. 2 is a block diagram illustrating in greater detail the functional components of an exemplary xDSL communications device 14. Device 14 contains an upstream communications and downstream communications path, as well as a controller 30 controlling the modules in device 14. The upstream path includes a line interface unit 32, an analog-to-digital (A/D) converter 34, and a network interface 36. The downstream path includes network interface 36, a digital engine 38, an analog front-end 40, and line interface unit 32. Network interface 36 provides an interface with network 16, and line interface unit 32 couples to CPE 18 via link 20. In general, controller 30 controls the components in device 14 to provide an xDSL link with CPE 18 having sufficient bandwidth for provisioned parameters 26 of the link, thus providing a high-speed interface between CPE 18 and network 16. Moreover, controller 30 adjusts operating characteristics of components in device 14 to reduce power consumption.

Network interface 36 couples to network 16 and S) provides for transmission and receipt of information using any suitable communications protocol. For example, network interface 36 may couple to network 16 using a T1 interface, T3 interface, E1 interface, integrated services digital network (ISDN) lines, high-speed asynchronous transfer mode (ATM) or frame relay interfaces, or any other suitable wireless or wireline link. Digital engine 38 receives downstream communications from network interface 36. These downstream communications may be in digital form, or digital engine 38 may convert received analog signals to digital form.

Digital engine 38 then assigns bits of data from the downstream communications for transmission according to operational instructions received from controller 30. In addition, digital engine 38 adheres to the requirements of the xDSL communications protocol in use when assigning the bits. For example, using a discrete multi-tone (DMT) protocol, digital engine 38 must assign bits to bins allocated by controller 30. Alternatively, using a carrierless amplitude and phase modulation (CAP) protocol, digital engine 38 must assign bits within a baud rate specified by controller 30. In addition to these specific examples, device 14 contemplates using digital engine 38 to assign bits according to any suitable xDSL transmission protocol. Once assigned, analog front-end (AFE) 40 modulates a signal encoding the assigned bits of data received from digital engine 38. AFE 40 modulates this signal into a frequency spectrum determined by controller 30. AFE 40 communicates this signal to line interface unit 32 for transmission to CPE 18. Thus, device 14 receives downstream communications using network interface 36, encodes the communications into bits using digital engine 38, modulates a signal encoding the bits using AFE 40, and then transmits the signal to CPE 18 using line interface unit 32.

Line interface unit (LIU) 32 couples to CPE 18 via link 20, and transmits and receives communications using any suitable digital subscriber line communications protocol. LIU 32 includes a line driver 42 that provides power for the transmission of signals to CPE 18. Line driver 42 provides power across an effective power spectrum, which can be-controlled by commands received from controller 30.

In addition, LIU 32 passes upstream communications received from CPE 18 to A/D converter 34. A/D converter 34 contains signal processing capabilities for handling the communications from CPE 18. A/D converter 34 converts these communications into a format suitable for transmission to network 16. According to a particular embodiment, A/D converter 34 decodes the xDSL signals to extract the encoded digital information and then communicates this information to network interface 36. However, A/D converter 34 may provide any suitable conversion between the signals received from CPE 18 and the signals required for transmission to network 16.

To aid in processing communications, device 14 has access to a memory 44 that stores operating parameters 46. Memory 44 represents any one or combination of volatile or non-volatile, local or remote devices suitable for storing data, for example, random access memory (RAM) devices, read-only memory (ROM) devices, magnetic storage devices, optical storage devices, or any other suitable data storage devices. Each device 14 may contain a separate memory 44, or a centralized memory 44 may contain operating parameters 46 accessed by multiple devices 14. For example, memory 44 may be all or a portion of system memory 24.

Operating parameters 46 include any information that controller 30 may use to control the operation of components within device 14. Operating parameters 46 further may include other information describing the operation of device 14 or other components in system 10. For example, parameters 46 may include provisioned parameters 26 for an xDSL link, such as a provisioned frequency bandwidth and a provisioned margin, trained parameters 28 for the link, such as an available frequency bandwidth and available margin, allocated parameters for the link, such as an allocated frequency bandwidth and margin, or any other suitable information for describing or controlling the operation of device 14.

According to a particular embodiment, device 14 trains an xDSL link with CPE 18 using LIU 32, determines an available bandwidth for downstream communications on the trained xDSL link, allocates a portion of the available bandwidth according to provisioned parameters 26 of the xDSL link, and adjusts a power spectrum of line driver 42 to correspond with the allocated bandwidth. According to another embodiment, device 14 detects a period of reduced activity on an xDSL link, reduces the bandwidth allocated for downstream communications, and adjusts the power spectrum of line driver 42 to correspond with the reduced allocated bandwidth. Device 14 may make these adjustments to the power spectrum before, after, or during data sessions on link 20.

Controller 30 allocates a portion of the available bandwidth according to trained parameters 28 and provisioned parameters 26 of the xDSL link and the xDSL protocol used for communications. For example, in a particular embodiment, device 14 communicates information with CPE 18 using a DMT protocol. For downstream communications, controller 30 allocates available low frequency bins sufficient to provide data throughput equal to or greater than the provisioned throughput. This provisioned throughput may provide, for example, a maximum and minimum bandwidth and a maximum and minimum available noise margin.

According to another embodiment, device 14 communicates with CPE 18 using a CAP protocol. Instead of the bin allocation required for DMT communications, device 14 must determine an appropriate baud rate for CAP communications. Thus, for a CAP communications protocol, controller 30 allocates bandwidth by determining the lowest available baud rate that will provide data throughput equal to or greater than a provisioned throughput. Therefore, for CAP communications, device 14 allocates bandwidth by determining a baud rate, whereas for DMT communications, device 14 allocates bandwidth by selecting bins to be used. For other xDSL communications protocols, device 14 may use any appropriate technique to allocate some portion of available bandwidth to provide bandwidth as provisioned. Once the portion of the available bandwidth has been chosen, device 14 may adjust the power spectrum of line driver 42 to correspond with the allocated bandwidth, thus reducing the power consumption of device 14.

Furthermore, device 14 may allocate and reallocate portions of the available bandwidth at any time. For example, controller 30 may detect a period of reduced activity on an xDSL link and determine that a required bandwidth during this period of inactivity is less than an allocated bandwidth. Controller 30 may then reallocate bandwidth to provide data throughput equal to or greater than the required bandwidth. After reallocating bandwidth, controller 30 may adjust an effective power spectrum of line driver 42 to correspond with the newly allocated bandwidth.

To further reduce the power consumption of device 14, controller 30 may adjust other operational characteristics of components within device 14. For example, according to a particular embodiment, controller 30 may determine that an available noise margin for an xDSL link exceeds a provisioned noise margin. To reduce power consumption, controller 30 may then reduce a power level for line driver 42 such that the available noise margin for the link corresponds to the provisioned margin. Therefore, by adjusting various operational characteristics, controller 30 reduces power consumption, cooling requirements, and interference, and potentially increases the available density of devices 14 in rack 12.

Although the example shown includes discrete functional components, system 10 contemplates device 14 having any collection and arrangement of functional components for performing the tasks described. Also, each of the components in device 14 may be implemented using any suitable combination and arrangement of hardware and/or software. In addition, functionalities from each of these components may be combined or separated into smaller functional units when appropriate, and any of the methods or functionalities described may be implemented by a computer program stored on a computer readable medium.

Figure 3:
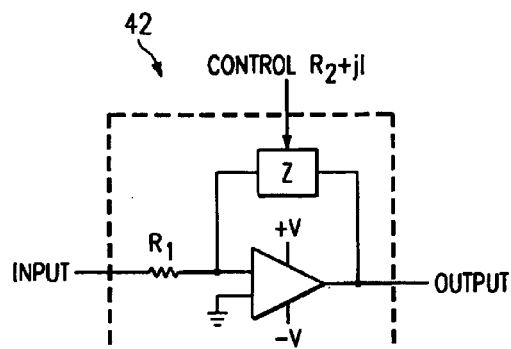
FIG. 3 is a simplified circuit diagram illustrating a line driver for the xDSL communications devices.

FIG. 3 is a simplified circuit diagram of an exemplary line driver 42. Line driver 42 includes an operational amplifier providing power to transmit signals. This operational amplifier may receive a voltage (+/−V) from one or multiple power supplies. In a particular embodiment, the operational amplifier receives power from either a first power supply or a second power supply. The first supply generates a power source sufficient to provide an effective power spectrum across an entire trained bandwidth, while the second source generates a power supply sufficient to provide an effective power spectrum across only a portion of the trained bandwidth. For example, the operational amplifier may be coupled to a fifteen volt and a five volt power supply, and controller 30 may select between the two supplies (or two power levels from a single supply) based on provisioned parameters 26, current operating conditions, or other requirements of an xDSL link.

Line driver 42 also includes a variable, complex impedance feedback loop. By controlling the real and imaginary portions of this complex impedance, controller 30 controls the operational characteristics of line driver 42. For example, controller 30 may adjust a power level and frequency cutoff for line driver 42 by changing the complex impedance. Thus, controller 30 may adjust the effective power spectrum of line driver 42 to correspond with an allocated bandwidth. When the allocated bandwidth is lower than a trained bandwidth, this results in a reduced power consumption for device 14. In a particular embodiment, line driver 42 acts as a low pass filter with a frequency cutoff set to correspond with the high end of an allocated bandwidth. For example, after allocating low frequency bins for a DMT link, controller 30 may set the frequency cutoff for line driver 42 to correspond to the highest bin allocated. Thus, line driver 42 provides power only across the allocated bandwidth. However, line driver 42 may be any suitable component that allows controller 30 to adjust an effective power spectrum to reduce power consumption of device 14.

Figure 4:
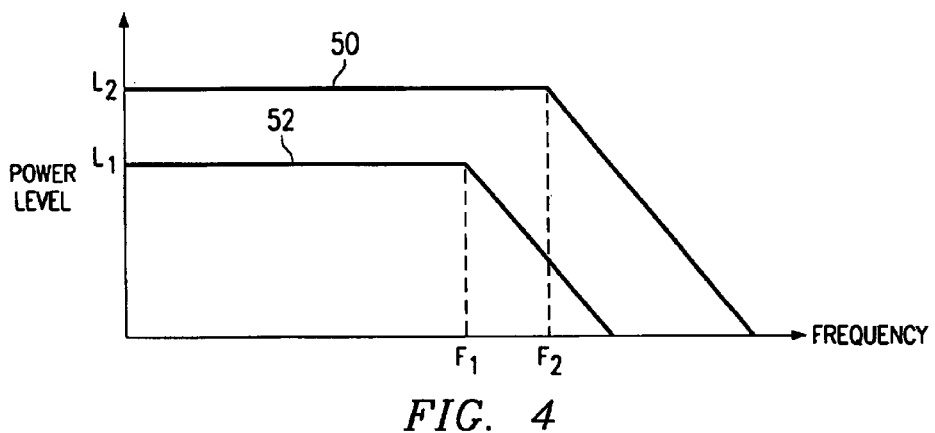
FIG. 4 is graph illustrating frequency response of the line driver.

FIG. 4 is a graph illustrating frequency response of an exemplary line driver 42. In this example, frequency $F_1$ represents the high end of a bandwidth allocated by controller 30, and frequency $F_2$ represents the high end of the available bandwidth of a trained xDSL link. Trace 50 displays the frequency response of line driver 42 across the entire available trained bandwidth. Line driver 42 provides a power level $L_2$ with a frequency cut off at $F_2$.

Using techniques as described above, controller 30 may allocate a portion of the trained bandwidth for the transmission of downstream communications, determine an upper frequency for the allocated bandwidth at $F_1$, and determine a sufficient noise margin at a power level of $L_1$. Controller 30 then adjusts the complex impedance of line driver 42, with trace 52 displaying the frequency response of line driver 42 corresponding with the allocated bandwidth.

By reducing the frequency cutoff from $F_2$ to $F_1$ and the power level from $L_2$ to $L_1$, the effective power spectrum of line driver 42 is reduced, resulting in a reduction in the power consumption of device 14. Moreover, because high frequency communications require more power than low frequency communications, the reduction in power consumption will be most significant when controller 30 allocates bandwidth from low frequency portions of the available bandwidth. However, system 10 contemplates controller 30 using any appropriate methods or algorithms to determine the most effective use of frequencies and power levels to minimize the power consumption of xDSL communications device 14. Moreover, the algorithms used by controller 30 may depend on the xDSL communications protocol in use.

Figure 5:
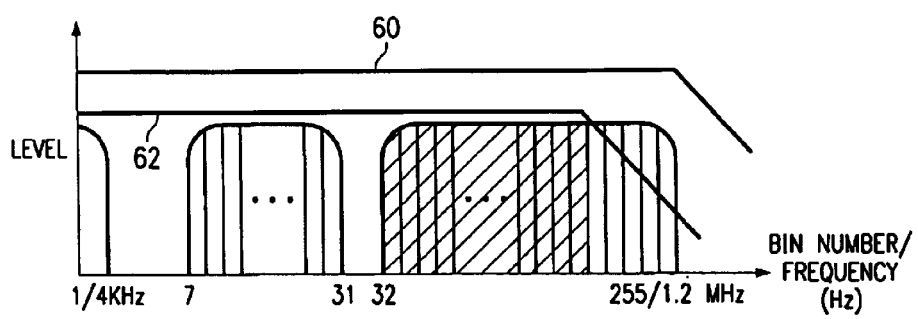
FIG. 5 is graph illustrating frequency response of the line driver and an exemplary bandwidth allocation.

FIG. 5 is a graph illustrating frequency response of line driver 42 as an overlay on an exemplary DMT bin allocation for an ADSL link. In the example, the trained link has bins #32 to #255 available for downstream communications. However, only the shaded bins are necessary to meet the provisioned parameters. Moreover, the power level of line driver 42 as trained provides greater margin than provisioned. Thus, controller 30 adjusts the frequency response of line driver 42 as trained, shown by trace 60, to a frequency response corresponding to the provisioned bandwidth and margin. Trace 62 displays the adjusted frequency response for line driver 42. As shown, the frequency cutoff for line driver 42 corresponds to the highest frequency bin allocated. To further reduce power consumption, controller 30 may adjust both a low frequency and high frequency cutoff for line driver 42. Thus, this illustrates only a specific example for adjusting the operation of line driver 42 to reduce power consumption of device 14. System 10 contemplates using any appropriate methods for allocating bandwidth and adjusting operational characteristics to reduce power consumption.

Figure 6:
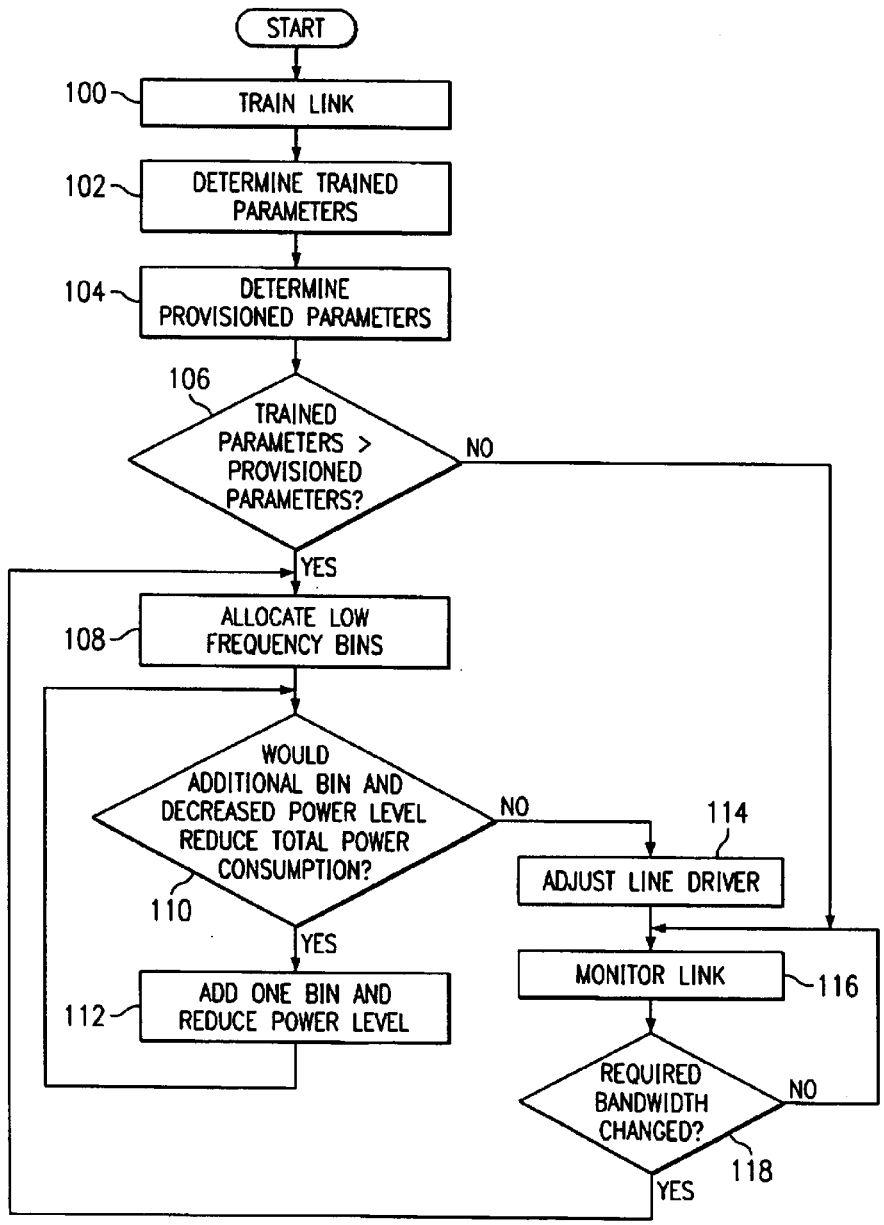
FIG. 6 is a flowchart illustrating a method for allocating bandwidth to reduce power consumption of the xDSL communications device.

FIG. 6 is a flowchart illustrating a method for allocating bandwidth for an xDSL link using a DMT communications protocol. Device 14 trains an xDSL link with CPE 18 using a DMT communications protocol at step 100. Controller 30 determines trained parameters 28 and provisioned parameters 26 of the xDSL link at steps 102 and 104 respectively. As previously discussed, trained parameters 28 represent what is available, while provisioned parameters 26 represent what has been assigned or promised for the link. Controller 30 determines whether the trained parameters exceed the provisioned parameters at step 106. If not, device 14 must use the entire trained bandwidth to provide sufficient data throughput for the provision parameters, thus flow skips to step 116. However, if the trained parameters exceed the provisioned parameters, controller 30 may allocate a portion of the available bandwidth for downstream communications.

As noted above, trained parameters 28 may include any information describing characteristics of the xDSL link, such as an available bandwidth and an available noise margin. Provisioned parameters 26 may include any information describing the xDSL service provisioned for the xDSL link, such as a provisioned bandwidth and a provisioned noise margin. Controller 30 may determine whether the trained parameters exceed the provisioned parameters by determining whether an available bandwidth for downstream communications exceeds a provisioned bandwidth for downstream communications. In this case, controller 30 may allocate bandwidth for downstream communications.

For DMT communications, controller 30 allocates bandwidth by determining the number of bins necessary to provide data throughput equal to or greater than the provisioned data throughput. According to a particular embodiment, controller 30 allocates low frequency bins first. Thus, controller 30 allocates low frequency bins at step 108. Controller 30 then determines whether an additional high frequency bin coupled with a decreased power level would reduce total power consumption at step 110. That is, in some cases, adding one more bin on the high frequency end of the allocated bandwidth may allow controller 30 to reduce the power level of line driver 42.

For example, allocating two bins each with six bits requires a higher power level than allocating three bins each with four bits. However, controller 30 must determine whether the use of an additional bin, coupled with a lower power level, would reduce overall power consumption. Thus controller 30 must determine whether the power required for the additional bin will be more than offset by the reduced power consumption obtained from the lower overall power level. For example, if the use of one additional bin would allow a power level decrease over tens or hundreds of bins, the total power consumption may be reduced despite the increase in the frequency response required by line driver 42. If so, controller 30 adds one bin to the allocated bins and reduces the power level for line driver 42 at step 112 and returns to the determination at step 110. If an additional bin would not allow for a decrease in total power consumption for device 14, flow skips to step 114.

After allocating bandwidth from the available bandwidth, controller 40 adjusts the operating characteristics of line driver 42 at step 114. Thus, controller 40 adjusts the effective power spectrum of line driver 42 to correspond with the frequency range of the allocated bins. For example, controller 30 may adjust the frequency cutoff of line driver 42 to correspond with the frequency of the highest bin in the allocated bandwidth and reduce the power level of line driver 42 to provide only the power required for the xDSL link. Controller 30 may adjust line driver 42 using any appropriate technique. For example, controller 30 may provide input parameters, set values for use by line driver 42, or use other suitable techniques to adjust the operation of line driver 42. Moreover, controller 30 also must ensure that digital engine 38 assigns bits into the allocated bandwidth. Therefore, controller 30 may communicate the allocated bandwidth to digital engine using any appropriate method.

During operation, controller 30 monitors the xDSL link to detect changes in bandwidth requirements and determines whether a required bandwidth for the xDSL link has changed at steps 116 and 118 respectively. For example, controller 30 may detect an extended period of low bandwidth usage, a period of increased bandwidth usage, an increase in the provisioned parameters, or any other suitable condition. If no change in required bandwidth is detected, controller 30 continues monitoring the xDSL link at step 116. However, if controller 30 detects a change in required bandwidth for the xDSL link, controller 30 reallocates bandwidth at step 108. Thus, controller 30 reallocates bins and readjusts line driver 42 as previously discussed.

The preceding flowchart illustrates a method for allocating bandwidth and reducing power consumption in a DMT environment. However, device 14 contemplates using similar methods for other xDSL communications protocols, such as a CAP communications protocol. For example, in CAP communications, bin assignments would be replaced by decisions as to the lowest available baud rate and/or constellation necessary to meet or exceed provisioned parameters 26.

The preceding flowchart illustrates only an exemplary method for allocating a portion of the available bandwidth and adjusting operating characteristics of line driver 42. Device 14 contemplates many of the steps in this flowchart taking place simultaneously and/or in different orders than as shown. Furthermore, device 14 contemplates using methods with additional steps, fewer steps, or different steps, so long as the methods remain appropriate for reducing the power consumption of device 14 through the allocation of portions of available bandwidth.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A digital subscriber line (xDSL) communications device comprising:
    a digital engine operable to assign bits of data for transmission in an allocated bandwidth;
    a line driver operable to provide power across an effective power spectrum for transmitting the bits of data;
    a memory storing provisioned parameters for an xDSL link; and
    a controller operable to:
        determine trained parameters of the xDSL link, wherein the trained parameters comprise an available bandwidth;
        allocate a portion of the available bandwidth as the allocated bandwidth based on the provisioned parameters; and
        adjust the effective power spectrum to correspond with the allocated bandwidth.

2. The communications device of claim 1, wherein the xDSL link comprises a twisted pair line forming a local loop coupled to a customer premises equipment.

3. The communications device of claim 1, wherein:
    the trained parameters comprise an upstream frequency bandwidth, an upstream margin, a downstream frequency bandwidth, and a downstream margin; and
    the available bandwidth comprises the downstream frequency bandwidth.

4. The communications device of claim 1, wherein the controller adjusts the effective power spectrum to correspond with the allocated bandwidth by selecting an alternative voltage supply level for the line driver.

5. The communications device of claim 1, wherein the controller adjusts the effective power spectrum by reducing a frequency cutoff of the line driver.

6. A digital subscriber line (xDSL) communications device comprising:
    a digital engine operable to assign bits of data for transmission in an allocated bandwidth using a discrete multi-tone (DMT) protocol, wherein the digital engine assigns the bits of data to a plurality of low frequency bins;
    a line driver operable to provide power across an effective power spectrum for transmitting the bits of data;
    a memory storing provisioned parameters for an xDSL link; and
    a controller operable to:
        determine trained parameters of the xDSL link, wherein the trained parameters comprise an available bandwidth;
        allocate a portion of the available bandwidth as the allocated bandwidth based on the provisioned parameters, wherein the allocated bandwidth comprises a frequency range corresponding to the plurality of low frequency bins, wherein the plurality of low frequency bins provides data throughput equal to or greater than the provisioned parameters; and
        adjust the effective power spectrum to correspond with the allocated bandwidth.

7. A digital subscriber line (xDSL) communications device comprising:
    a digital engine operable to assign bits of data for transmission in an allocated bandwidth using a carrierless amplitude and phase modulation (CAP) protocol;
    a line driver operable to provide power across an effective power spectrum for transmitting the bits of data;

a memory storing provisioned parameters for an xDSL link; and a controller operable to:
determine trained parameters of the xDSL link, wherein the trained parameters comprise an available bandwidth;
allocate a portion of the available bandwidth as the allocated bandwidth based on the provisioned parameters, wherein the allocated bandwidth comprises a baud rate providing data throughput equal to or greater than the provisioned parameters; and
adjust the effective power spectrum to correspond with the allocated bandwidth.

8. A digital subscriber line (xDSL) communications device comprising:
a digital engine operable to assign bits of data for transmission in an allocated bandwidth;
a line driver operable to provide power across an effective power spectrum for transmitting the bits of data, wherein the line driver comprises an amplifier having a feedback loop with a variable complex impedance;
a memory storing provisioned parameters for an xDSL link; and
a controller operable to:
determine trained parameters of the xDSL link, wherein the trained parameters comprise an available bandwidth;
allocate a portion of the available bandwidth as the allocated bandwidth based on the provisioned parameters; and
adjust the effective power spectrum to correspond with the allocated bandwidth by adjusting a real and an imaginary portion of the variable complex impedance.

9. A digital subscriber line (xDSL) communications device comprising:
a digital engine operable to assign bits of data for transmission in an allocated bandwidth;
a line driver operable to provide power across an effective power spectrum for transmitting the bits of data;
a memory storing provisioned parameters for an xDSL link; and
a controller operable to:
determine trained parameters of the xDSL link, wherein the trained parameters comprise an available bandwidth;
allocate a portion of the available bandwidth as the allocated bandwidth based on the provisioned parameters;
adjust the effective power spectrum to correspond with the allocated bandwidth;
detect a period of reduced activity, wherein a required bandwidth during the period of reduced activity is less than the allocated bandwidth;
reduce the allocated bandwidth; and
adjust the effective power spectrum to correspond with the reduced allocated bandwidth.

10. A method for reducing power consumption on a digital subscriber line (xDSL) link, comprising:
training the xDSL link;
determining trained parameters of the xDSL link, wherein the trained parameters comprise an available bandwidth;
determining provisioned parameters of the xDSL link;
allocating a portion of the available bandwidth for the xDSL link based on the provisioned parameters; and
adjusting analog characteristics of a line driver to correspond with the allocated portion of the available bandwidth.

11. The method of claim 10, wherein the available bandwidth comprises a downstream frequency bandwidth.

12. The method of claim 10, wherein adjusting the analog characteristics of the line driver comprises selecting an alternative voltage supply level for the line driver.

13. The method of claim 10, wherein the allocated portion of the available bandwidth comprises a low frequency portion of the available bandwidth.

14. A method for reducing power consumption on a digital subscriber line (xDSL) link, comprising:
training the xDSL link;
determining trained parameters of the xDSL link, wherein the trained parameters comprise an available bandwidth;
determining provisioned parameters of the xDSL link;
allocating a portion of the available bandwidth for the xDSL link based on the provisioned parameters, wherein the allocated portion of the available bandwidth comprises low frequency bins of the available bandwidth for communicating data using a discrete multi-tone (DMT) communications protocol; and
adjusting analog characteristics of a line driver to correspond with the allocated portion of the available bandwidth.

15. A method for reducing power consumption on a digital subscriber line (xDSL) link, comprising:
training the xDSL link;
determining trained parameters of the xDSL link, wherein the trained parameters comprise an available bandwidth;
determining provisioned parameters of the xDSL link;
allocating a portion of the available bandwidth for the xDSL link based on the provisioned parameters, wherein the allocated portion of the available bandwidth comprises an assigned baud rate for communicating data using a carrierless amplitude and phase modulation (CAP) protocol, wherein the assigned baud rate is less than a maximum available baud rate given the available bandwidth; and
adjusting analog characteristics of a line driver to correspond with the allocated portion of the available bandwidth.

16. A method for reducing power consumption on a digital subscriber line (xDSL) link, comprising:
training the xDSL link;
determining trained parameters of the xDSL link, wherein the trained parameters comprise an available bandwidth;
determining provisioned parameters of the xDSL link;
allocating a portion of the available bandwidth for the xDSL link based on the provisioned parameters; and
adjusting analog characteristics of a line driver to correspond with the allocated portion of the available bandwidth, wherein adjusting the analog characteristics of the line driver comprises reducing a frequency cutoff of the line driver to correspond to a high end frequency of the allocated portion of the available bandwidth.

17. A method for reducing power consumption on a digital subscriber line (xDSL) link, comprising:
training the xDSL link;
determining trained parameters of the xDSL link, wherein the trained parameters comprise an available bandwidth;

determining provisioned parameters of the xDSL link;
allocating a portion of the available bandwidth for the xDSL link based on the provisioned parameters; and
adjusting analog characteristics of a line driver to correspond with the allocated portion of the available bandwidth, wherein adjusting the analog characteristics of the line driver comprises adjusting a real and an imaginary portion of a variable complex impedance feedback loop of the line driver.

18. Software for reducing power consumption on a digital subscriber line (xDSL) link, the software embodied on a computer readable medium and operable to:
   determine trained parameters of the xDSL link, wherein the trained parameters comprise an available bandwidth;
   determine provisioned parameters of the xDSL link;
   allocate a portion of the available bandwidth for xDSL communications based on the provisioned parameters; and
   adjust analog characteristics of a line driver to correspond with the allocated portion of the available bandwidth.

19. The software of claim 18, wherein the available bandwidth comprises a downstream frequency bandwidth.

20. The software of claim 18, further operable to adjust the analog characteristics of the line driver by selecting an alternative voltage supply level for the line driver.

21. The software of claim 18, wherein the allocated portion of the available bandwidth comprises a low frequency portion of the available bandwidth.

22. Software for reducing power consumption on a digital subscriber line (xDSL) link, the software embodied on a computer readable medium and operable to:
   determine trained parameters of the xDSL link, wherein the trained parameters comprise an available bandwidth;
   determine provisioned parameters of the xDSL link;
   allocate a portion of the available bandwidth for the xDSL link based on the provisioned parameters, wherein the allocated portion of the available bandwidth comprises low frequency bins of the available bandwidth for communicating data using a discrete multi-tone (DMT) communications protocol; and
   adjust analog characteristics of a line driver to correspond with the allocated portion of the available bandwidth.

23. Software for reducing power consumption on a digital subscriber line (xDSL) link, the software embodied on a computer readable medium and operable to:
   determine trained parameters of the xDSL link, wherein the trained parameters comprise an available bandwidth;
   determine provisioned parameters of the xDSL link;
   allocate a portion of the available bandwidth for the xDSL link based on the provisioned parameters, wherein the allocated portion of the available bandwidth comprises an assigned baud rate for communicating data using a carrierless amplitude and phase modulation (CAP) protocol, wherein the assigned baud rate is less than a maximum available baud rate of the available bandwidth; and
   adjust analog characteristics of a line driver to correspond with the allocated portion of the available bandwidth.

24. Software for reducing power consumption on a digital subscriber line (xDSL) link, the software embodied on a computer readable medium and operable to:
   determine trained parameters of the xDSL link, wherein the trained parameters comprise an available bandwidth;
   determine provisioned parameters of the xDSL link;
   allocate a portion of the available bandwidth for the xDSL link based on the provisioned parameters; and
   adjust analog characteristics of a line driver to correspond with the allocated portion of the available bandwidth by reducing a frequency cutoff of the line driver to correspond to a high end frequency of the allocated portion of the available bandwidth.

25. Software for reducing power consumption on a digital subscriber line (xDSL) link, the software embodied on a computer readable medium and operable to:
   determine trained parameters of the xDSL link, wherein the trained parameters comprise an available bandwidth;
   determine provisioned parameters of the xDSL link;
   allocate a portion of the available bandwidth for the xDSL link based on the provisioned parameters; and
   adjust analog characteristics of a line driver to correspond with the allocated portion of the available bandwidth by adjusting a real and an imaginary portion of a variable complex impedance feedback loop of the line driver.

26. A digital subscriber line (xDSL) communications device comprising:
   means for training a xDSL link;
   means for determining trained parameters of the xDSL link, wherein the trained parameters comprise an available bandwidth;
   means for determining provisioned parameters of the xDSL link;
   means for allocating a portion of the available bandwidth for the xDSL link based on the provisioned parameters; and
   means for adjusting analog characteristics of a line driver to correspond with the allocated portion of the available bandwidth.

27. The communications device of claim 26, wherein the available bandwidth comprises a downstream frequency bandwidth.

28. The communications device of claim 26, wherein the means for adjusting analog characteristics of the line driver comprises means for selecting an alternative voltage supply level for the line driver.

29. The communications device of claim 26, wherein the allocated portion of the available bandwidth comprises a low frequency portion of the available bandwidth.

30. A digital subscriber line (xDSL) communications device comprising:
   means for training a xDSL link;
   means for determining trained parameters of the xDSL link, wherein the trained parameters comprise an available bandwidth;
   means for determining provisioned parameters of the xDSL link;
   means for allocating a portion of the available bandwidth for the xDSL link based on the provisioned parameters, wherein the allocated portion of the available bandwidth comprises low frequency bins of the available bandwidth for communicating data using a discrete multi-tone (DMT) communications protocol; and
   means for adjusting analog characteristics of a line driver to correspond with the allocated portion of the available bandwidth.

31. A digital subscriber line (xDSL) communications device comprising:

means for training a xDSL link;

means for determining trained parameters of the xDSL link, wherein the trained parameters comprise an available bandwidth;

means for determining provisioned parameters of the xDSL link;

means for allocating a portion of the available bandwidth for the xDSL link based on the provisioned parameters, wherein the allocated portion of the available bandwidth comprises an assigned baud rate for communicating data using a carrierless amplitude and phase modulation (CAP) protocol, wherein the assigned baud rate is less than a maximum available baud rate of the available bandwidth; and means for adjusting analog characteristics of a line driver to correspond with the allocated portion of the available bandwidth.

32. A digital subscriber line (xDSL) communications device comprising:

means for training a xDSL link;

means for determining trained parameters of the xDSL link, wherein the trained parameters comprise an available bandwidth;

means for determining provisioned parameters of the xDSL link;

means for allocating a portion of the available bandwidth for the xDSL link based on the provisioned parameters; and means for adjusting analog characteristics of a line driver to correspond with the allocated portion of the available bandwidth, wherein the means for adjusting the analog characteristics of the line driver comprises means for reducing a frequency cutoff of the line driver to correspond to a high end frequency of the allocated portion of the available bandwidth.

33. A digital subscriber line (xDSL) communications device comprising:

means for training a xDSL link;

means for determining trained parameters of the xDSL link, wherein the trained parameters comprise an available bandwidth;

means for determining provisioned parameters of the xDSL link;

means for allocating a portion of the available bandwidth for the xDSL link based on the provisioned parameters; and means for adjusting analog characteristics of a line driver to correspond with the allocated portion of the available bandwidth, wherein the means for adjusting the analog characteristics of the line driver comprises means for adjusting a real and an imaginary portion of a variable complex impedance feedback loop of the line driver.

* * * * *